(12) United States Patent
Shen

(10) Patent No.: US 6,519,378 B1
(45) Date of Patent: Feb. 11, 2003

(54) METHOD AND APPARATUS FOR IMPLEMENTATION OF AN UNPOLARIZED MONOCHROMATIC LIGHT SOURCE

(75) Inventor: Paisheng Shen, Fremont, CA (US)

(73) Assignee: Alliance Fiber Optics Products, Inc., Sunnyvale, CA (US)

( * ) Notice: Subject to any disclaimer, the term of this patent is extended or adjusted under 35 U.S.C. 154(b) by 0 days.

(21) Appl. No.: 09/164,902

(22) Filed: Oct. 1, 1998

Related U.S. Application Data

(63) Continuation-in-part of application No. 08/847,177, filed on May 1, 1997, now Pat. No. 5,933,555.

(51) Int. Cl.[7] ................................................. G02B 6/26
(52) U.S. Cl. ............................. 385/11; 385/24; 385/32
(58) Field of Search ................................ 385/32, 11, 24

(56) References Cited

U.S. PATENT DOCUMENTS

| 4,712,306 A | * | 12/1987 | Cahill et al. ................. 33/304 |
| 4,968,112 A | | 11/1990 | Lovely et al. |
| 5,408,545 A | | 4/1995 | Lee et al. |
| 6,034,924 A | * | 3/2000 | Vakoc ........................ 367/149 |

FOREIGN PATENT DOCUMENTS

WO   WO 93 05430   3/1993

* cited by examiner

*Primary Examiner*—Hung N. Ngo
(74) *Attorney, Agent, or Firm*—Wei Te Chung

(57) ABSTRACT

An unpolarized monochromatic light source with wavelength tunable capability wherein a monochromatic laser source (10) is connected to an incoherent cascaded fiber-ring depolarizer (14) through a single mode fiber (16) under the condition that $L_d \gg L_C$ wherein $L_d$ is the length of fiber-ring delay line (18) and $L_C$ is the coherence length of the light source (10). The combination of the monochromatic laser source (10) and the incoherent cascaded fiber ring depolarizer (14) can be further connected to an external modulator (30) for amplitude modulation, frequency modulation, or phase modulation of the light signal.

13 Claims, 2 Drawing Sheets

METHOD AND APPARATUS FOR IMPLEMENTATION OF AN UNPOLARIZED MONOCHROMATIC LIGHT SOURCE

This is a continuation-in-part application Ser. No. 08/847,177 filed May 1, 1997 now U.S. Pat. No. 5,933,555.

BACKGROUND OF THE INVENTION

1. Field of the Invention

The invention relates to a method and the corresponding apparatus for implementing an unpolarized monochromatic light source, and particularly to an arrangement of wavelength tunable capability.

2. The Related Art

In the modern devices testing, such as fiber-optics Dense Wavelength Division Multiplexer (DWDM), $Er^{+3}$ Doped Fiber Amplifier (EDFA), and Fiber Bragg Granting (FBG), it should be measured with unpolarized light to eliminate the influence of potential polarization dependencies because such testing is suffered due to the high DOP (Degree Of Polarization) of the light source used in the testing. It is appreciated that the DOP is used to characterize the polarization percentage of a light source wherein the DOP of a laser source can be as high as 99% compared with an ideally unpolarized source which substantially approaches to 0%. Unfortunately but factually, the testing instruments, like photodetector module of the inexpensive optical power meter or optical granting of the expensive optical spectrum analyzer, are both substantially intrinsic polarization-dependent, thus resulting in measurement errors thereof. Understandably, using an unpolarized light source can efficiently eliminate the polarization-dependence loss of such polarization-dependent testing instruments.

On the other hand, wave-dependent parameters, e.g., wavelength dependent insertion loss or wavelength dependent gain, are required to precisely characterize the performance of the tested devices or systems in wavelength domain. Therefore, generally there are two type light sources are preferred for this application wherein one is of the wavelength tunable light sources and the other is of the broadband light sources. The former is a tunable laser which may work with the aforementioned inexpensive optical power meter while unfortunately owns high DOP up to 99%, and the latter is an ASE source which owns somewhat the smaller DOP proximate to 5% while the ASE source is expensive and should work with the aforementioned expensive optical spectrum analyzer. In detailed analysis, the ELED (or SLD) and ASE sources are most popular broadband unpolarized light sources which may be chosen to be used with the latter because of the lower DOPs (e.g., 15% for ELED source and 5% for ASE source) to suppress the polarization dependence sensitivity. Anyhow, due to their broadband spectrums, they all have to work with the expensive optical spectrum analyzer in stead of the inexpensive a lower cost optical power meter. Moreover, ELED has the limitation in high dynamic range test for its lower output power, and ASE source is still very expensive today. Regarding the former, such tunable laser being substantially monochromatic for its narrower spectral width so as to work with an inexpensive optical power meter, has wavelength tunability to scan a wide range spectrum and is good for testing, but its high DOP (>99%) characteristics will suffer the polarization-dependency error.

In brief, the combination of the equipment of either the former (i.e., the tunable laser associated with the optical power meter), or the latter (i.e., the ASE source associated with the optical spectrum analyzer), is still sensitive to input polarization. Therefore, a good unpolarized light source (i.e., the ultra low DOP<1% and the low cost), with wavelength tunable capability is desired in today's instrumentation.

Regarding the method of depolarization, several Pseudo-depolarized methods have been introduced while they are either by using spectrum-averaging method, like Lyot depolarizer (for example, U.S. Pat. Nos. 4,556,293 and 5,692,082), or by time-averaging method, like polarization modulation (for example, U.S. Pat. Nos. 5,359,678 and 4,923,290). For the former, i.e., the spectrum-averaging method, a broadband light sources (e.g., superluminescent diode; SLD) must be chosen wherein the SLD is expensive and has an undesired lower output power. For the latter, i.e., the time-averaging method, a slower detector, compared with the polarization modulating time, should be used while the instantaneous DOP thereof is still unity (DOP=100%) and it is of a so-called active device approach which costs money and more failure possibility due to extra devices involved. Generally, those Pseudo depolarized methods are not true and efficient depolarization methods and still have some incorrectness disadvantages in some circumstances. This is the reason why the parent application (Ser. No. 08/847,177 filed May 1, 1997) presents a so-called polarization-averaging in which the output approaches to an ideal unpolarized light wherein "Light shows no preferential directional properties when resolved in different directions at right angles to the direction of propagation." (see "Principle of Optics", M. Burn and E. Wolf, pp 544–555, 1980).

Therefore, an object of the invention is to provide a newly unpolarized monochromatic light source with wavelength tunable capability so as to open a new way to simplify the complexity to the performance verification of wavelength-dependent testing.

SUMMARY OF THE INVENTION

The invention is to provide an unpolarized monochromatic light source with wavelength tunable capability wherein a monochromatic laser source is connected to an incoherent cascaded fiber-ring depolarizer through a single mode fiber under the condition that $L_d \gg L_C$ wherein $L_d$ is the length of fiber-ring delay line and $L_C$ is the coherence length of the light source. The combination of the monochromatic laser source and the incoherent cascaded fiber ring depolarizer can be further connected to an external modulator for amplitude modulation, frequency modulation, or phase modulation of the light signal.

DETAILED DESCRIPTION OF THE PREFERRED EMBODIMENTS

Figure 1:
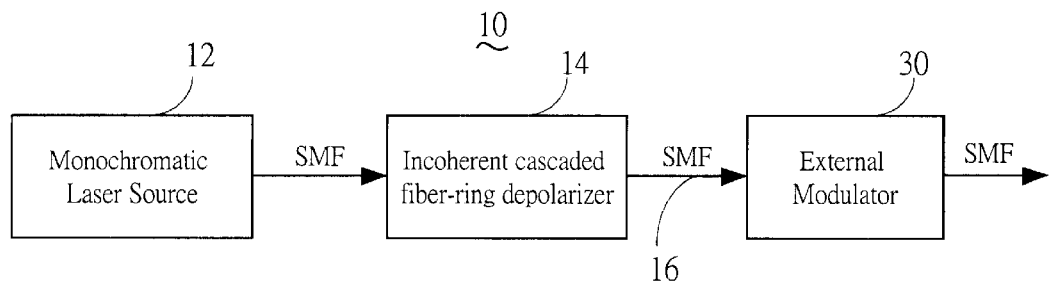
FIG. 1 is a block diagram illustrating the principle of an aspect of the present invention.

References will now be in detail to the preferred embodiments of the invention. While the present invention has been described in with reference to the specific embodiments, the description is illustrative of the invention and is not to be construed as limiting the invention. Various modifications to the present invention can be made to the preferred embodiments by those skilled in the art without departing from the true spirit and scope of the invention as defined by appended claims.

It will be noted here that for a better understanding, most of like components are designated by like reference numerals throughout the various figures in the embodiments. As shown in FIGS. 1–5, the invention is to provide a an unpolarized monochromatic light source 10 with tunable capability wherein a monochromatic laser source 12 is connected to an incoherent cascaded fiber ring depolarizer 14 through a single mode fiber (SMF) 16 by fusion splicer or fiber connector under the condition of $L_d \gg L_C$ wherein $L_d$ is the length of the fiber-ring delay line 18 of the depolarizer 14 and $L_C$ is the coherence length of the light source 10.

Figure 2:
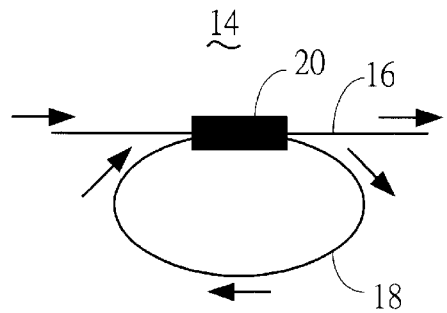
FIG. 2 shows a basic unit portion of the depolarizer of FIG. 1.
Figure 3:
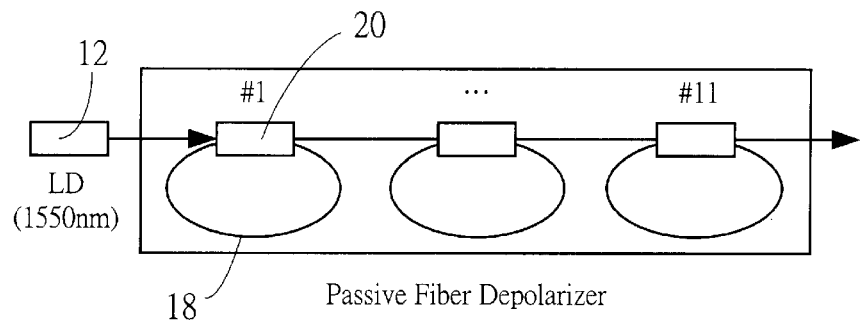
FIG. 3 shows the complete unit assembly of the depolarizer of FIG. 1 cooperating with the light source.

FIGS. 2 and 3 previously disclosed in the aforementioned copending parent application, discloses the depolarizer 14 using cascaded 2×2 single mode coupler 20, without using any polarization control elements. The advantage includes low cost, insensitive to input polarization, and good characters of an all fiber device. The fiber-ring delay line 18 is formed by connecting one of the input and the output ports of the 2×2 coupler 20. As understood, to act as a depolarizer, the interferometric behavior in the ring must be negligible. This condition will be satisfied when the length of the fiber-ring delay line 18 is much longer than the coherence length of the light source 10, with the equation: $L_d \gg L_C$ where $L_d$ is the length of the fiber-ring delay line 18 and $L_C$ is the length of the coherence length of the light source 10.

Under this situation, each recirculating beam passing through the fiber-ring delay line is out of coherent with all the others. Each recirculating beams will pass through different birefringence mechanism; therefore, the state of polarization of each recirculating field at the emerging port could be different. The output is superposition of different polarization states with different intersities. Depolarization occurs by averaging over the many different polarization states of the recirculating beams. The output density will be the same as input intensity if the non-interferometric condition satisfied. The DOP of the light source could be depolarized to infinitesimal (DOP proximate to 0%) naturally as long as cascading more non-interferometic fiber-ring in series. The total eleven, for example, fiber-rings have been cascaded serially to achieve the stability of output power and ultra-low degree of polarization (DOP<1%). This structure, as shown in FIG. 3, results in insensitivity to input polarization and was able to successfully eliminate the polarization noise in a polarization sensitive fiber system. The description of the copending parent application should be referred hereto for better understanding.

In this embodiment, the selected light source is a 1550-nm, for example, commercial low-cost F-P laser diode, which has a coherence length much shorter than the fiber-ring delay line. The depolarizer 14 is made by cascaded eleven fiber-rings together. The coupler 20 is set with coupling ratio 1:2 wherein 1 is the lead for output and 2 is the lead to loop back to form the fiber-ring. The pigtail of each fiber lead is 1.5-m thus the fiber-ring delay line 18 is of 3.0-m which is much longer than the coherence length $L_C$ of the light source 10, e.g. $\Delta\lambda$=0.1-nm corresponding to $L_C$=2.4-cm at 1550-nm. Then, this combination has successfully achieved DOP proximate to −20 dB (1%) degree of polarization limited by the such polarization-sensitive testing instrument.

Figure 4:
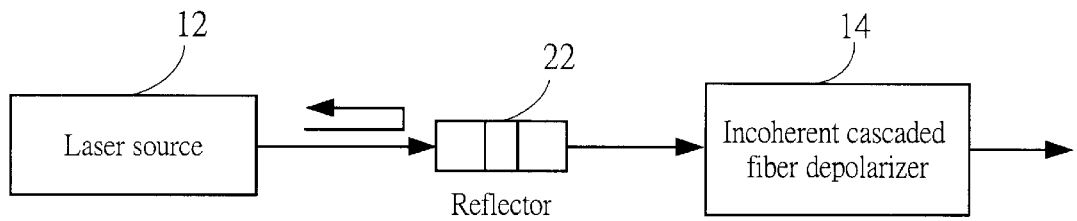
FIG. 4 is a block diagram illustrating a presently preferred method to reduce the coherence length so that it is easy to satisfy the required condition of $L_d \gg L_C$.

Also referring to FIG. 4, for those laser with center longitudinal mode (spectral peak) being much higher (e.g., 3–6 dB) than the next side lobes, which corresponds to the longer coherence length by following the equation that $L_C=(\lambda_C)^2/\Delta\lambda$ wherein $L_C$ is the coherence length of the light source, $\lambda_C$ is the light source center wavelength, and $\Delta\lambda$ is spectral linewidth or FWHM (Full Width at Half Maximum), a spectral tailoring device 22 is provided between the light source 10 and the depolarizer 14. This device is at least one reflector, e.g. creating air-gap between two connectors, to obtain more reflection power back to light source 10. The reflected light will experience additional amplification as it propagates through the laser cavity. The spectrum of the output light can be modified by selecting reflector with the appropriate reflectance. In this manner, the peak frequency of the output spectrum is minimized, then the coherence length can be reduced to easily satisfy the required condition of $L_d \gg L_C$. This method increases the flexibility of the light source being acquired to satisfy $L_d \gg L_C$.

It is appreciated that in the invention, a tunable laser is adopted of which the spectral characteristics should satisfy the condition of $L_d \gg L_C$. For example, the tunable laser made by fiber laser technology with spectral linewidth 0.01-nm at center wavelength 1550-nm, corresponding to the coherence length $L_C$ 24-cm, which is much less than the fiber delay line, $L_d$ 300-cm. The wavelength tunable range of this light source around 50-nm has been achieved at 1550-nm region.

Figure 5:
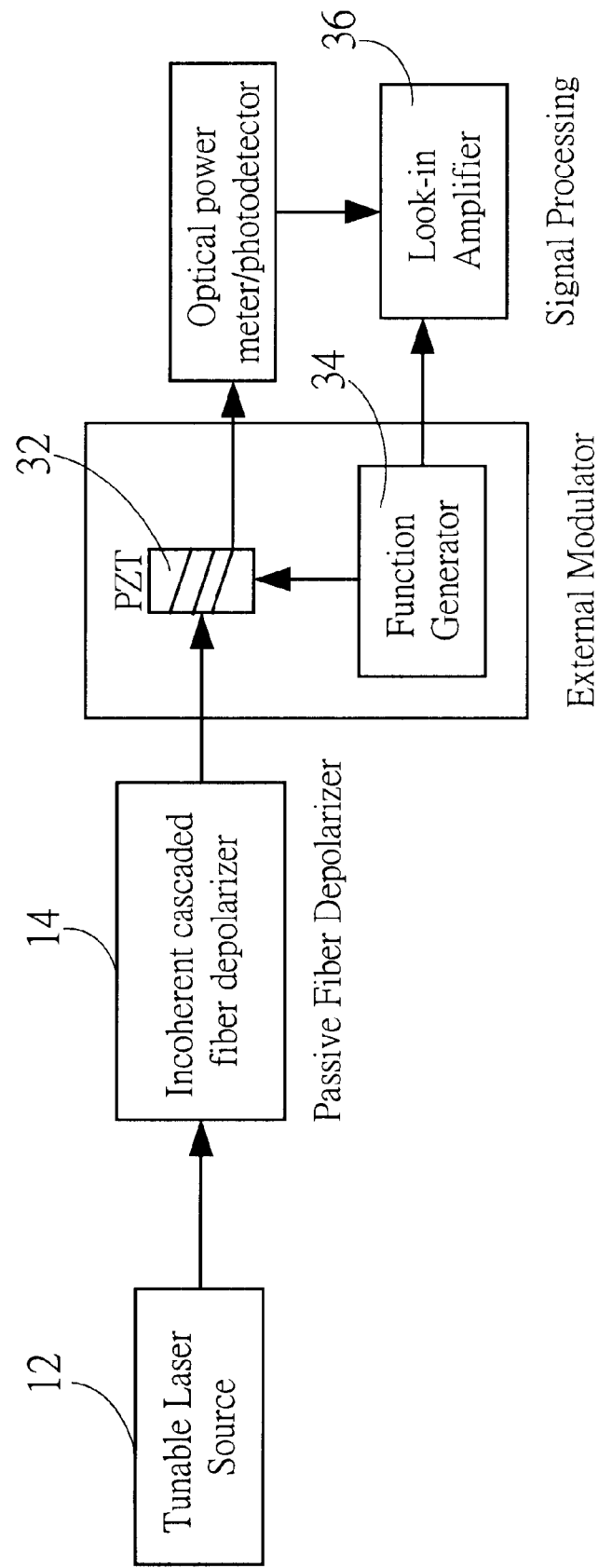
FIG. 5 is a block diagram illustrating optional devices interconnected to the testing system of the invention.

Further referring to FIG. 5, for some applications, the modulation, e.g., amplitude modulation, frequency modulation, or phase modulation, of the light signal is desired. Then, an external modulator 30 can be installed following the depolarizer 14. For example, a PZT 32 with a signal generator 34 can be used to modulate the amplitude of the light signal in a testing system or modulate the optical phase in a interferometric sensor system. The modulated signal is received by an optical receiver. For some applications, a signal processing instrument, like a lock-in Amplifier 36, is used to demodulate the light signal and examine the desired signal for ultra high precision measurement. The external modulator can be other devices, like EOIC type modulator depending on its application.

In comparison with the prior art, the invention has advantages of lower degree of polarization (DOP proximate to 1% or less) in comparison with regular tunable laser sources (DOP proximate to 99%), or low cost, narrow bandwidth with moderate output power and wavelength tunable capability in comparison with unpolarized broadband ELED (DOP proximate to 15%) and ASE (DOP proximate to 5%) sources which requires to cooperate with an aforementioned expensive optical spectral analyzer. Understandably, the invention can cooperate with an inexpensive optical power meter as the traditional tunable laser source but without their serious polarization problem. In addition, due to its narrow band and unpolarized characteristics, it can be applied to test the insertion low with exactly desired wavelength of a polarization devices, like polarizer (either bulk optical or fiber devices), precisely and more time-saving. In conclusion, the wavelength tunable capability this unpolarized source introduces a new method to simplify the complexity to the performance verification of wavelength-dependent testing. For example, it has the demand to measure the wavelength dependent Insertion Loss (I.L.) of a wavelength-division multiplexing (WDM) device in manufacture or the average gain of an EDFA to implement its adjustment and evaluation.

It is also noted that the depolarizer 14 is made in a passive manner without the so-called traditional active component involved, thus resulting in lowering the cost.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Therefore, person of ordinary skill in this field are to understand that all such equivalent structures are to be included within the scope of the following claims.

I claim:

1. An apparatus for implementation of a tunable unpolarized monochromatic light source, comprising:
   a monochromatic light source;
   an incoherent cascaded fiber-ring depolarizer; and
   an optical fiber connected between said light source and said depolarizer.

2. The apparatus as defined in claim 1, wherein the fiber is of a single mode fiber.

3. The apparatus as defined in claim 1, wherein a length of a fiber-ring delay line of the fiber-ring depolarizer is much longer than a coherence length of the light source.

4. The apparatus as defined in claim 1, wherein a spectral linewidth of the light source is about 0.01-nm at 1550-nm center wavelength.

5. The apparatus as defined in claim 4, wherein a coherence length of the light source is 24-cm.

6. The apparatus as defined in claim 5, wherein the length of the fiber-ring delay line is about 3-m.

7. The apparatus as defined in claim 1, wherein an external modulator is connected to the depolarizer.

8. The apparatus as defined in claim 1, wherein a spectral tailoring device is connected to either said light source or said depolarizer.

9. The apparatus as defined in claim 1, wherein said fiber-ring depolarizer includes more than one sets of couplers with coupling ratio 1:2 and wherein 1 is a first lead for output and 2 is a second lead to loop back to form the fiber-ring.

10. A method of implementation of an unpolarized monochromatic light source, the steps comprising:
    providing a monochromatic light source;
    providing a passive fiber depolarizer with more than one sets of incoherent cascaded fiber-ring; and
    providing a fiber interconnected between said light source and said depolarizer.

11. The method as defined claim 10, wherein a length of each fiber ring delay line is much larger than a coherence length of the light source.

12. The method as defined in claim 11, wherein an external modulator is connected to the depolarizer.

13. An arrangement of providing a tunable unpolarized laser source in a polarization-sensitive testing device, comprising:
    a monochromatic laser source;
    an incoherent cascaded fiber-ring depolarizer comprising more than one sets of fiber-ring; and
    a spectral tailoring device interconnected between said laser source and said depolarizer so as to assure a length of each set of fiber-ring is much larger than a coherence length of the laser source.

* * * * *